MAGNETIC MEMORY DEVICES

INVENTOR.
Akira Matsushita
Takashi Sakuma
Mitsuo Sekiya
BY
Wenderoth & Wenderoth INVENTOR.
Akira Matsushita
Takeshi Sakuma
Mitsuo Sekiya
BY
Wenderoth & Masters

United States Patent Office 3,441,916 Patented Apr. 29, 1969

3,441,916

MAGNETIC MEMORY DEVICES

Akira Matsushita, Takashi Sakuma, and Mitsuo Sekiya, Tokyo-to, Japan, assignors to Toko Kabushiki Kaisha Tokyo-to, Japan, a joint-stock company of Japan Filed July 9, 1964, Ser. No. 381,356
Claims priority, application Japan, July 11, 1963, 38/36,968
Int. Cl. G11b *5/66*
U.S. Cl. 340—174 5 Claims

ABSTRACT OF THE DISCLOSURE

A magnetic memory device of the matrix type has interwoven conductors as word lines transmitting word drive current, and magnetic film coated conductors transmitting digit current; and the word lines are so arranged that directions of two kinds of magnetic fluxes, produced by word drive currents passing through adjacent word lines, are directed opposite to each other.

This invention relates to a magnetic memory device which utilizes continuous magnetic films and more particularly to a magnetic memory device wherein there are utilized a plurality of conductors having coatings of a magnetic material and serving as digit lines and a plurality of word lines which are disposed to cross said digit lines, the intersection of said lines forming a bit.

It is an object of this invention to provide a novel magnetic memory device utilizing continuous magnetic films between adjacent bits.

Another object of this invention is to decrease as far as possible the mutual interference between adjacent bits.

A further object of this invention is to decrease the spacing between adjacent bits, thus decreasing the size of the magnetic memory device without incurring undesirable interference between adjacent bits.

Briefly stated this invention provides a magnetic memory device comprising a woven fabric including warps consisting of a group of conductors serving as word lines and wefts consisting of a group of conductors provided with a coating of magnetic material and serving as digit lines. It is a unique feature of this invention that the direction of magnetic flux created by word currents flowing through different word lines is the same for the same conductor having a magnetic coating.

The features of the invention which are believed to be novel are set forth with particularity in the appended claims. The invention itself, however, as to its organization together with further objects and advantages thereof, may best be understood by reference to the following description taken in connection with the accompanying drawings in which:

Figures 1, 2, 3, 4:
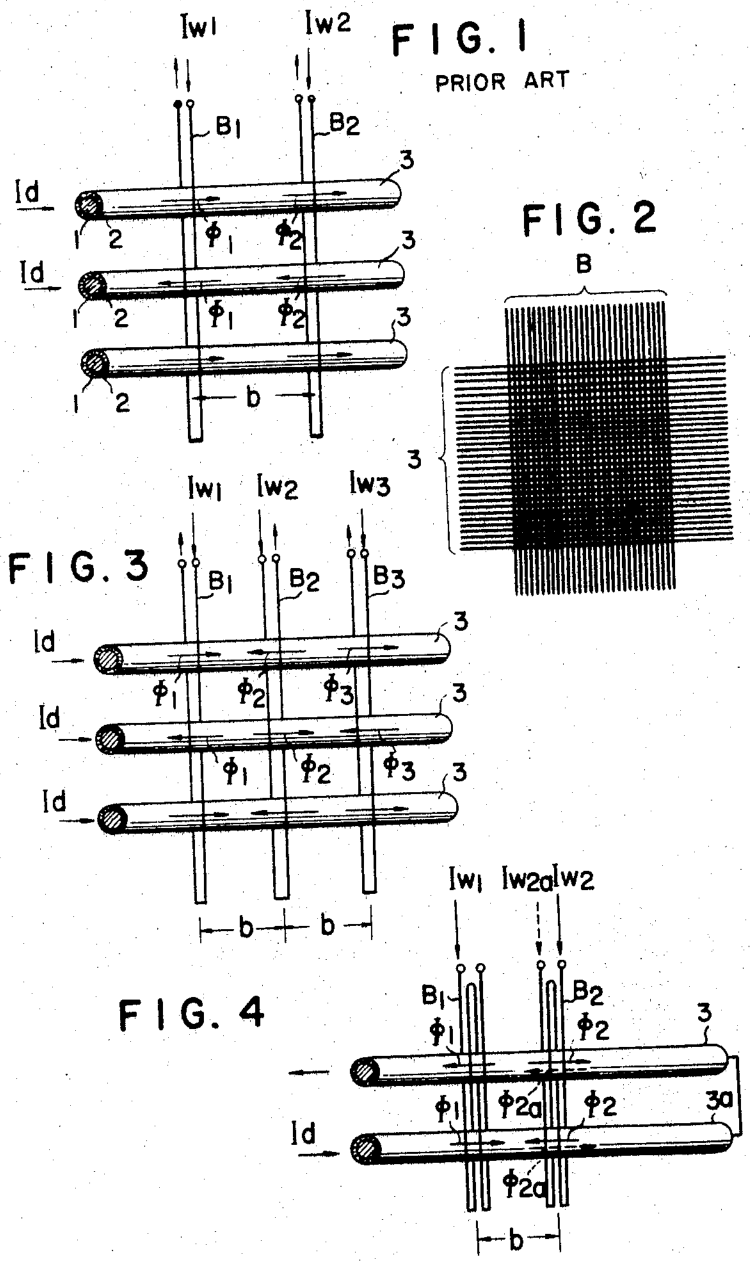
FIG. 1 is a diagrammatic representation of a typical conventional word driving system in a woven fabric type memory device.
FIG. 2 is a plan view illustrating the manner in which a plurality of digit lines and word lines are woven.
FIGS. 3 and 4 illustrate two examples of this invention as applied to a woven fabric type memory device.

In order to facilitate better understanding of this invention, a brief explanation of a magnetic memory device of the type above referred to will be made by referring to FIGS. 1 and 2 of the accompanying drawings. Basically, a magnetic memory device generally comprises a woven matrix consisting of a plurality of conductors 3 (for brevity hereinafter referred to as "plated wires") each comprising a core 1 of an electric conductor and a film or coating 2 of a magnetic material deposited on the surface of the core 1 by any suitable method, such as electrolytic plating or vapor deposition process, and a plurality of word lines B which are woven to cross said conductors 3 and are electrically insulated therefrom, thereby to form numerals bits ranging from several hundreds to several thousands, as shown in FIG. 1. Heretofore, a number of configurations have been proposed, including a woven fabric type comprising a plurality of warps consisting of a number of groups of word lines $B_1$, $B_2$, $B_3$ . . . and a plurality of wefts consisting of plated wires 3, and a printed type wherein a plurality of plated wires 3 are covered by a board upon which groups of word lines B are printed.

As is well known in the art, in the woven fabric type matrix memory device, it is possible to interweave spacer wires with the warps or the word lines or with the wefts or the plated wires. It is also possible to weave a fabric consisting of warps of word lines and wefts comprising plated wires, and to utilize either or both of the said conductors or wires as spacers by leaving the respective terminals open.

In each of the above outlined types, as a number of plated wires having continuous magnetic films are woven to cross a number of word lines, small bit spacings will result in mutual interference between adjacent bits. This phenomena can be explained by referring to FIG. 1 which is an enlarged view of a portion of the prior art woven fabric type magnetic matrix. It is supposed now that a word drive pulse current $I_{w1}$ is passed through a word line $B_1$, FIG. 1, and that a positive or negative digit drive pulse current $I_d$ is passed through a plated wire 3. Then the direction of magnetization of the magnetic film in the region adjacent to the point at which the word line $B_1$ and the plated wire 3 cross each other is determined by the relative directions of currents to store the information as binary digit 1 or 0, depending upon said direction of magnetization. Similarly, another binary digit can be stored by another word drive pulse current $I_{w2}$ supplied to the adjacent word line $B_2$. However, since the prior art magnetic matrix memory device has been constructed and operated in a manner such that the directions of the fluxes in the same plated wire created by word drive current $I_{w1}$, $I_{w2}$ . . . flowing through the respective word lines $B_1$, $B_2$ . . . are directed as indicated by $\phi_1$, $\phi_2$ . . . when opposite information is written in the intersecting point, respectively between one of the plated wires 3 and the drive line $B_1$ and on the same plated wire 3 and the other drive line $B_2$, the content of memory which was stored previously will be disturbed by the memory stored later.

In order to prevent such a disturbance or interference, it is necessary to have substantially large bit spacings *b*. If one attempts to write in and read out information with $I_d$=50 milliamperes and $I_w$=1 ampere, which are typical operating currents, the bit spacings *b* should be generally larger than 3 mm. when magnetic coatings of a thickness of about 2 microns are used, for example. It is to be understood that the spacings must be determined by taking into consideration the thickness of the magnetic coatings.

Our experiments have revealed that if the matrix is constructed and operated in a manner such that the directions of magnetic fluxes in the same plated wire which are created by a word drive current $I_{w1}$ flowing through a first word line $B_1$ and a word drive current $I_{w2}$ flowing through an adjacent word line $B_2$ are opposite as indicated by $\phi_1$ and $\phi_2$ in FIG. 3, the mutual interference between adjacent bits will be greatly decreased and consequently, the bit spacings $b$ can be reduced to about 1 mm.

Figures 5, 6, 7:
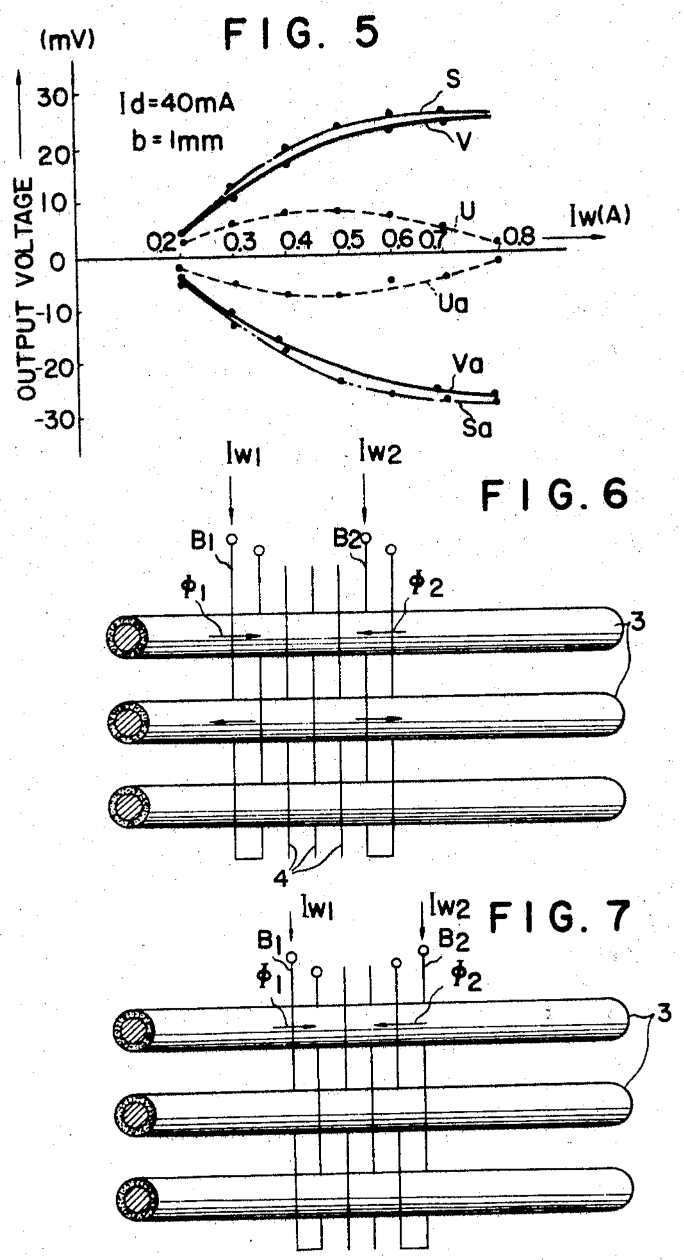
FIG. 5 is a graph showing the result of experiments.
FIGS. 6 and 7 illustrate two different embodiments of this invention.

These results are plotted in FIG. 5. They were obtained from a woven matrix including a loop formed by interconnecting the corresponding ends of two adjacent plated wires or wefts 3 and $3_a$ and two groups of word lines $B_1$ and $B_2$ each comprising a two turn coil formed by four juxtaposed word lines, as shown in FIG. 4, which were connected in series with 1 mm. bit spacing $b$ between adjacent groups of word lines $B_1$ and $B_2$ and a constant digit current $I_d$=40 milliamperes.

Curves S and $S_a$, FIG. 5, indicate the values of output voltages which are induced in the plate wire 3 when a word drive current $I_{w1}$ of 0.2 to 0.8 amperes is passed through the conductor $B_1$.

In this state, since no information is stored in the adjacent bit there is no possibility of a mutual interference occurring with the adjacent bit, so that the output is at the maximum value dependent upon the magnitudes of $I_{w1}$ and $I_d$ at that time. Output curves U and $U_a$ shown in FIG. 5 were obtained by writing "1" at the intersecting points by means of the currents $I_{w1}$ and $I_d$, passing $I_{w2a}$ through the adjacent word line $B_2$ so that a magnetic flux is created in the direction indicated by $\phi_{2a}$, and repeating the writing operation of binary "0" in the bit 200 times which is opposite to the information stored in the adjacent bit, and finally reading out the information previously written in by the currents $I_{w1}$ and $I_d$. As can be seen from FIG. 5, the maximum value of the output voltage is within a range of ±10 mv. which is only about ⅓ of the values of S and $S_a$.

When the word driving current $I_{w2a}$ ($I_w$, in FIG. 5) is increased to about 0.8 ampere, the output voltage is reduced nearly to zero. The reason for this is beleived to be on account of the fact that as $I_{w2a}$ increases, interference between adjacent bits increases to disturb the memory written in by $I_{w1}$. In other words, for practical use the bit spacing $b$ must be increased.

On the other hand, if the write-in and read-out are carried out by passing the word drive current $I_{w2}$ through the word line $B_2$ in such a direction as to induce a flux $\phi_2$ in the opposite direction with respect to the flux $\phi_1$, and the other conditions are unchanged, then, output voltages as represented by curves V and $V_a$, FIG. 5, will be obtained, which approximate curves S and $S_a$. Generally, curves V and $V_a$ have values which are very close to those of curves S and $S_a$, respectively, and there is a tendency for the output voltage to increase with the word drive current $I_w$. This means that, even when the bit spacing $b$ is reduced to a value as small as 1 mm., there is very little mutual interference between adjacent bits, and, therefore, decrease in the output caused by interference can be limited to a very small value.

In order to produce magnetic flux $\phi_1$ and $\phi_2$ of opposite directions any one of the following methods may be used.

(1) Polarities of currents $I_{w1}$ and $I_{w2}$ are caused to be opposite as shown in FIG. 3.

(2) In the case of a woven fabric type, even with the same polarities of the currents $I_{w1}$ and $I_{w2}$, an odd number of spacer wires 4 are interposed between word lines $B_1$ and $B_2$ as shown in FIG. 6.

(3) The terminals of the word lines are provided alternately on the opposite sides to pass current $I_{w1}$ and $I_{w2}$ as indicated by arrows in FIG. 7.

The spacing methods of (2) and (3) have the advantage in that the fabrication of the woven matrix is facilitated between the active wires for the word lines can be selected as desired, depending on the word current polarities. The open lines are used for the spacing wires.

While the invention has been described with reference to a woven fabric type memory device utilizing conductors provided with coatings of magnetic material, it should be understood that this invention can be applied with equal effectiveness to a printed type memory device wherein plated wires are covered by a printed sheet upon which groups of word lines are printed.

It is to be understood that the above described arrangements are simple illustrations of the principle of the invention. Other arrangements may be deviced by those skilled in the art which will embody the principle of the invention and fall within the spirit and scope thereof as defined in the appended claims.

We claim:

1. A magnetic memory device of the matrix type, comprising conductors serving as word lines, conductors coated with magnetic thin film having anisotropic characteristic and serving as digit lines, two kinds of said word lines and digit lines being arranged to cross substantially perpendicularly to each other to form a matrix, means operable for applying word drive current to said word lines, means actuatable for applying digit current to said digit lines, said word lines being so arranged, and connected to said means for applying word drive current to the word lines, that directions of two kinds of the magnetic fluxes, produced by word drive currents passing respectively through adjacent word lines and applied to said magnetic thin films in the direction of magnetization difficult axis of said magnetic thin film, are mutually opposite to each other.

2. A magnetic memory device of the matrix type, according to claim 1, in which in the case where all word lines are arranged to cross the digit lines in the same manner, terminals of all word lines are connected to the means for supplying word drive current to the word lines so that current directions of the word lines are alternately opposite to one another.

3. A magnetic memory device of the matrix type, according to claim 1, in which all word lines are grouped by several turns, and input terminals of each two adjacent groups are positioned at both sides of the plane including said two adjacent groups.

4. A magnetic memory device of the matrix type, according to claim 1, in which an odd number of spacer wires are positioned between two adjacent word lines of each pair, said spacer wires and word lines being interwoven, and input terminals of said adjacent word lines are positioned at the same side of the plane including said word lines and spacer wires.

5. A magnetic memory device of the matrix type, according to claim 1, in which an even number of spacer wires are positioned between two adjacent word lines of each pair, said spacer wires and word lines being interwoven, and input terminal of said adjacent word lines are positioned at both opposite sides of the plane including said word lines and spacer wires.

References Cited

UNITED STATES PATENTS

| | | | |
|---|---|---|---|
| 3,286,242 | 11/1966 | Gianola | 340—174 |
| 3,069,661 | 12/1962 | Gianola | 340—174 |
| 3,377,581 | 4/1968 | Boles et al | 340—174 |
| 3,366,938 | 1/1968 | Matsushita | 340—174 |
| 3,348,061 | 10/1967 | Oshima et al. | 307—88 |

JAMES W. MOFFITT, *Primary Examiner.*